H. L. COAKLEY.
AEROPLANE.
APPLICATION FILED JUNE 24, 1915.
1,207,373.
Patented Dec. 5, 1916.
3 SHEETS—SHEET 1.
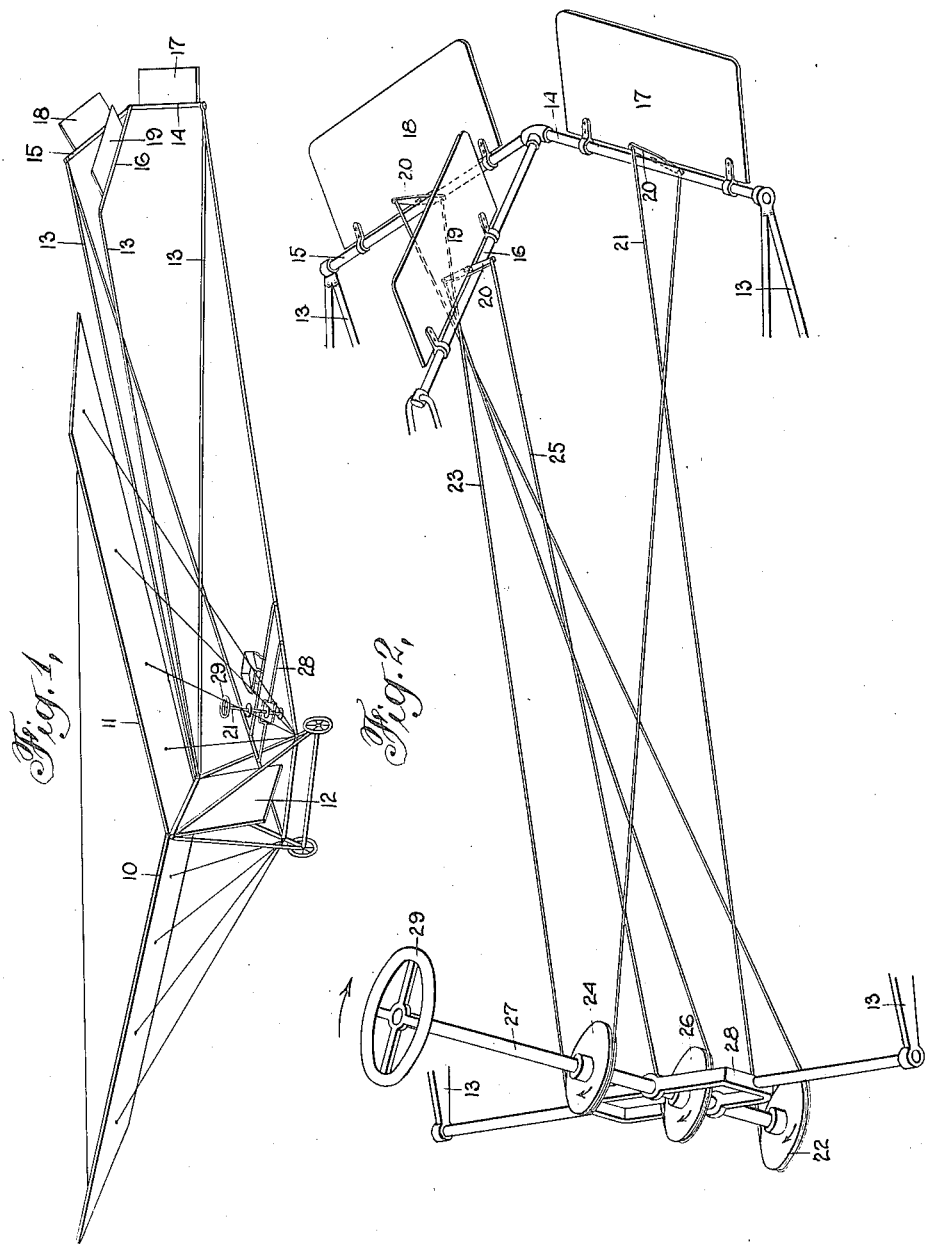
WITNESSES
INVENTOR
Henry L. Coakley
ATTORNEYS

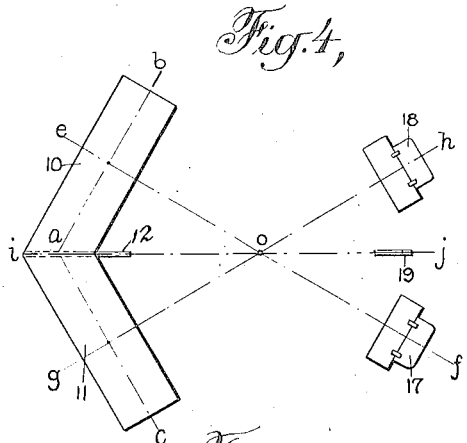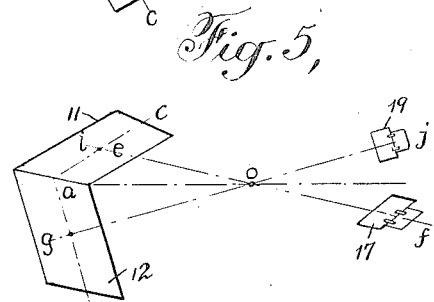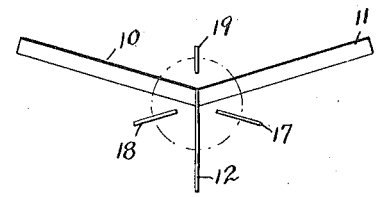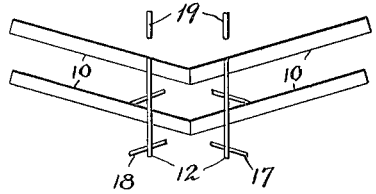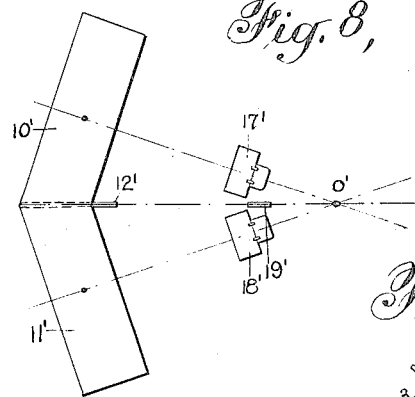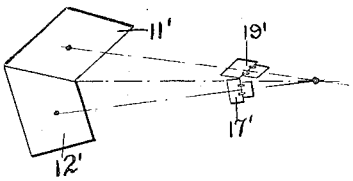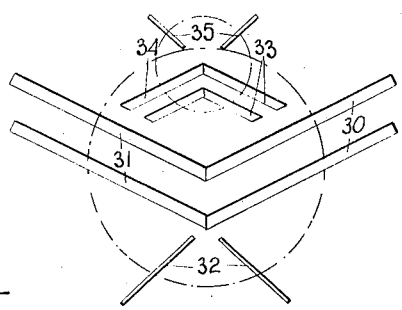

H. L. COAKLEY.
AEROPLANE.
APPLICATION FILED JUNE 24, 1915.

1,207,373.

Patented Dec. 5, 1916.
3 SHEETS—SHEET 3.

WITNESSES
L. Hauerstein
B. Joff

INVENTOR
Henry L. Coakley
BY Munn & Co
ATTORNEYS

UNITED STATES PATENT OFFICE.

HENRY L. COAKLEY, OF NEW YORK, N. Y.

AEROPLANE.

1,207,373.  Specification of Letters Patent.  Patented Dec. 5, 1916.

Application filed June 24, 1915. Serial No. 36,087.

*To all whom it may concern:*

Be it known that I, HENRY L. COAKLEY, a citizen of the United States, and a resident of the city of New York, borough of Manhattan, in the county and State of New York, have invented a new and Improved Aeroplane, of which the following is a full, clear, and exact description.

My invention relates to means for controlling aeroplanes, and has reference more particularly to a combination of fixed and movable parallel planes the axes of which are disposed angularly.

The invention is characterized by fixed single or parallel planes forming predetermined dihedral angles and movable planes the swinging axes of which are parallel to a corresponding fixed plane or set of parallel planes, and which swinging axes form angles equal to the corresponding dihedral angles of the fixed planes or set of parallel planes.

The invention is further characterized by controlling means associated with the movable planes whereby all of the movable planes can be displaced simultaneously in the same or different directions.

The object of the invention is to provide a simple, efficient and positive aeroplane control which will respond readily to all movements of the aviator's body in accordance with his desire or necessity at any particular time, whether ascending, descending, turning or in any other movement of the aeroplane.

With the above and other objects in view, the nature of which will more fully appear as the description proceeds, the invention consists in the novel construction, combination and arrangement of parts as herein fully described, illustrated and claimed.

Figure 10:
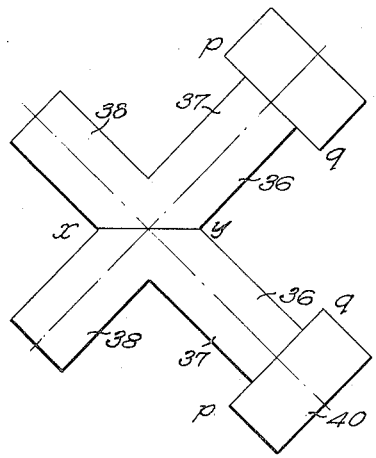
Figure 11:
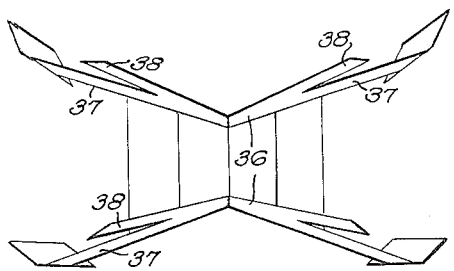
Figure 12:
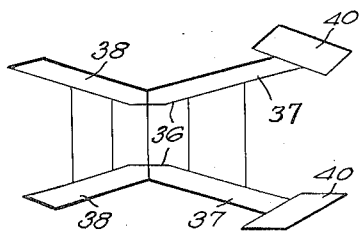
Figure 13:
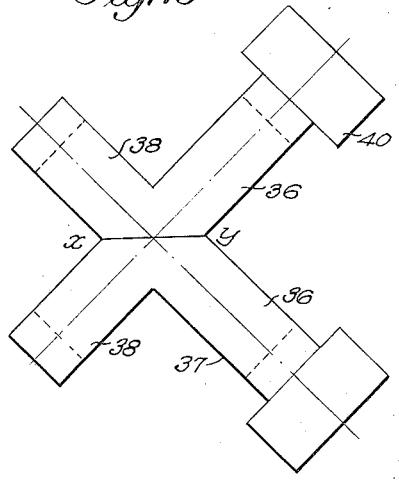
Figure 14:
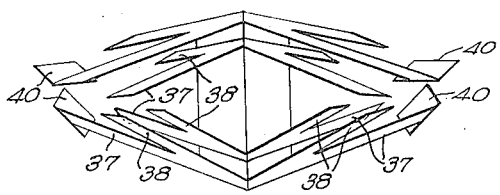
Figure 15:
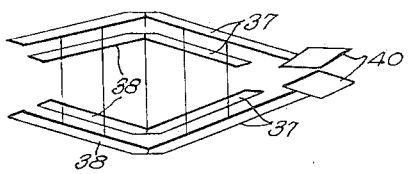

In the accompanying drawings, forming part of the application, similar characters of reference indicate corresponding parts in all the views, and Figure 1 is a perspective of an aeroplane embodying the principles of my invention; Fig. 2 is a diagrammatic view of the movable planes and means for controlling the same; Fig. 3 is a diagrammatic view showing the relation of the fixed and movable planes of the aeroplane; Fig. 4 is a plan view showing the relation of the fixed and movable planes; Fig. 5 is a diagrammatic side elevation of the fixed and movable planes; Fig. 6 is a diagrammatic front elevation when there is a plurality of fixed and movable planes; Fig. 7 is a diagrammatic side elevation of a modified structure of my aeroplane; Fig. 8 is a diagrammatic plan view thereof; Fig. 9 is a diagrammatic front elevation of a further modified aeroplane structure in which a plurality of parallel fixed and movable planes are shown; Fig. 10 is a plan view of a further modified structure of the aeroplane; Fig. 11 is a front elevation thereof; Fig. 12 is a side elevation thereof; Fig. 13 is a plan view of an aeroplane as shown in Fig. 10 but having a plurality of fixed and movable planes parallelly disposed; Fig. 14 is a front elevation thereof; and Fig. 15 is a side elevation of the structure shown in Fig. 13.

Before proceeding to a more detailed description of my invention, it must be understood that this invention is an improvement over my Patent No. 1,110,895 issued September 15, 1914.

Referring to Figs. 1 to 5 inclusive, 10, 11 and 12 represent fixed planes, which planes form therebetween predetermined dihedral angles. The framework 13 of the aeroplane has the rear braces 14, 15 and 16 so related that their angular relation is equal to the angular relation of the fixed planes, and also that brace 14 is parallel to the longitudinal axis $a$—$b$ of the plane 10, the brace 15 parallel to the longitudinal axis $a$—$c$ of the plane 11, and the brace 16 parallel to the longitudinal axis $a$—$d$ of the plane 12. Mounted to swing on the brace 14 is a plane or aileron 17. A similar plane or aileron 18 is mounted to swing on the brace 15. The brace 16 also carries a swinging plane or aileron 19. Normally the angular relation between these ailerons is the same as that of the fixed planes 10, 11 and 12; and the plane 10 is parallel to the aileron 17; plane 11, to the aileron 18; and plane 12, to the aileron 19. Consequently each fixed plane has a corresponding movable plane, and their axes $e$—$f$, $g$—$h$ and $i$—$j$ will intersect at a common point $o$ lying in the longitudinal axis of the aeroplane. These axes are the stabilizing axes of the aeroplane. Each of the ailerons is provided with oppositely directed arms 20 to the ends of which arms flexible members are connected. The end of the arm lying above the brace 14 has connected thereto the end of the flexible member 21 which passes over a pulley 22 from where it is directed to the end of the upper arm 20 of the aileron 18 and is connected thereto. The end of the lower opposite arm has connected thereto one end of a flexible member 23 which runs over a pulley 24 and is connected with its other end to the end of the lower arm of the aileron 17. It will be noted that the lower or flexible member 21 is crossed, while the upper one 23 is not. A crossing flexible member 25 also connects the arms 20 of the aileron 19 and passes over a pulley 26. All of the said pulleys 22, 24 and 26 are mounted on a common shaft 27 which is mounted to rotate in a frame 28 which in turn is mounted to swing in the framework 13. A hand wheel 29 is provided on the shaft 27 whereby the shaft can be turned in its bearings in the arm 28, and, also, by pulling on the hand wheel the frame 28 can be moved in the framework 13. As the wheel 29 is turned to the right, the aileron 19 will turn to the right; the aileron 17 will turn downward, and the aileron 18 will turn upward, thus causing the aeroplane to incline along its longitudinal axis toward the right and, consequently, cause the aeroplane to turn to the right side. The turning of the hand wheel 29 in the opposite direction will move the ailerons in the opposite directions and, consequently the machine will turn to the left. When it is desired to ascend or descend the aviator rocks the shaft 27; and since the pulley 26 is in the center of oscillation, there will be no displacement of the aileron 19, while the two ailerons 17 and 18 will move in the same direction, that is to say, if the shaft 27 is rocked away from the aviator, the ailerons 17 and 18 will move downward; if toward, upward. The combination of the rotating and rocking movement of the shaft 27 gives the aviator perfect control in navigating his aeroplane. It will be noted that the angles of displacement of the ailerons or tail planes can be varied relatively to each other in predetermined fixed relation, that is to say, the dihedral angles between the aileron 19 and the ailerons 17 and 18 will increase proportionately or decrease proportionately to the movement of the ailerons 17 and 18 under the rocking action of the shaft 27, although the dihedral angle between the ailerons 17 and 18 will vary as the ailerons 17 and 18 move from their normal position by the rocking movement of the shaft 27. When the shaft 27 is rotated the dihedral angles between the ailerons 17, 18 and 19 will vary, so that while the angle between the ailerons 19 and 18 decreases, that between the ailerons 19 and 17 will increase, and vice versa. The change in the dihedral angle between the planes 17 and 18 will vary according to the displacement caused by the rotation of the shaft 27. Therefore, it will be seen that under the rocking or turning action of the shaft 27 the dihedral angles between the ailerons are varied; and in combining the two movements of the shaft 27 an even adjustment between the angles of the ailerons is obtained.

In Fig. 6 a modification of the aeroplane is shown; and in this figure pairs of parallel fixed planes and movable planes are provided. Their angular relation is the same as described in Figs. 1 to 5 inclusive; and the fixed and movable planes are on opposite sides of a common center $o$.

In Figs. 7 and 8 a further modified structure of my aeroplane is shown. In this structure the movable or tail planes are placed on the same side of a common center $o'$, each corresponding fixed and movable plane being placed to one side of the longitudinal axis of the aeroplane, as, for example, 10′ and 17′ are to one side of the longitudinal axis; 11′ and 18′ are to the other side, and 12′ and 19′ are below the longitudinal axis of the aeroplane.

In Fig. 9 a further modified structure of my aeroplane is shown, in which structure parallel fixed planes 30 and 31 are provided in the front part of the frame; while at the rear, movable parallel tail planes or ailerons are provided, of which the parallel ailerons 33 are correlated to the fixed plane 31; parallel ailerons 34, to the fixed planes 30; and the ailerons 35, to the fixed planes 32. All the longitudinal axes of the correlated planes intersect at a common point lying in the longitudinal axis of the aeroplane.

In Figs. 10 to 15 the modified structure illustrated shows V planes 36 and 38 intersecting near the apex of the V's, on line $x-y$, said intersecting planes forming a dihedral angle on the line of intersection. The superimposing planes are so related that the part 37 of an upper V plane is parallel to the part 38 of a lower V plane which part is on the opposite side of the aeroplane axis and faces the other upper V plane. It is evident that this is true in Figs. 13 to 15 although there are sets of parallel planes to each side of the axis of the aeroplane. The tail planes 40 swing on the axis $p-q$ which is at right angles to the branch of the tail plane to which it is secured.

Having thus described my invention, I claim as new and desire to secure by Letters Patent:

1. In an aeroplane, a plurality of tail planes, one of which is substantially in a vertical plane and the others transverse thereof at each side of said vertical plane, all of said planes having the transverse axes thereof at an angle to the longitudinal axis of the aeroplane, and means for actuating said planes simultaneously or for moving the transverse planes only while the vertical plane remains substantially undisturbed.

2. In an aeroplane, three fixed planes, a similar plurality of movable planes forming the tail of the aeroplane, each of the fixed planes having a corresponding movable plane, the axes of the corresponding fixed and movable planes having a common center lying in the longitudinal axis of the aeroplane, said corresponding fixed and movable planes being on opposite sides of the common center, and means for controlling the movable planes.

3. In an aeroplane V shaped planes intersecting near their vertices on a line in a plane with the axis of the aeroplane to form a flat V therebetween, tail planes secured to the rear branches of said V planes and means for moving said tail planes relative to said fixed planes.

4. In an aeroplane V shaped fixed planes forming dihedral angles the vertices of which lie in a plane with the axis of the aeroplane, tail planes associated with each of the rearward branches of the V planes and movable on an axis at right angles to the corresponding branch, and means for actuating said tail planes.

5. In a biplane, upper main planes intersecting on a line lying in the vertical plane of the longitudinal axis of the biplane, said intersecting planes forming therebetween a flat V, and lower main planes similarly intersecting and also forming a flat V therebetween, the upper and lower main planes disposed on opposite sides of the vertical plane of the biplane being parallel, tail planes secured to the rear of the main planes, and means for moving said tail planes relative to said main planes.

In testimony whereof I have signed my name to this specification in the presence of two subscribing witnesses.

HENRY L. COAKLEY.

Witnesses:
B. JOFFE,
PHILIP D. ROLLHAUS.